(12) United States Patent
Okano

(10) Patent No.: US 11,358,097 B2
(45) Date of Patent: Jun. 14, 2022

(54) GAS RECOVERY AND CONCENTRATION DEVICE

(71) Applicant: SEIBU GIKEN CO., LTD., Fukuoka (JP)

(72) Inventor: Hiroshi Okano, Fukuoka (JP)

(73) Assignee: SEIBU GIKEN CO., LTD., Fukuoka (JP)

(*) Notice: Subject to any disclaimer, the term of this patent is extended or adjusted under 35 U.S.C. 154(b) by 92 days.

(21) Appl. No.: 16/976,714

(22) PCT Filed: Jan. 28, 2019

(86) PCT No.: PCT/JP2019/002748
§ 371 (c)(1),
(2) Date: Aug. 28, 2020

(87) PCT Pub. No.: WO2019/187582
PCT Pub. Date: Oct. 3, 2019

(65) Prior Publication Data
US 2020/0406186 A1     Dec. 31, 2020

(30) Foreign Application Priority Data
Mar. 28, 2018 (JP) .............................. JP2018-060998

(51) Int. Cl.
*B01D 53/62* (2006.01)
*B01D 53/02* (2006.01)
*B01D 53/96* (2006.01)

(52) U.S. Cl.
CPC .......... *B01D 53/62* (2013.01); *B01D 53/025* (2013.01); *B01D 53/96* (2013.01);
(Continued)

(58) Field of Classification Search
CPC ................. B01D 53/62; B01D 53/025; B01D 2253/3425; B01D 2257/504; B01D 2257/80
(Continued)

(56) References Cited

U.S. PATENT DOCUMENTS

| 2016/0175772 A1* | 6/2016 | Maruyama | ............. B01D 53/62 |
| | | | 422/180 |
| 2016/0271556 A1* | 9/2016 | Okano | ................... B01D 53/83 |
| 2017/0014750 A1* | 1/2017 | Yoshikawa | ............. B01J 20/04 |

FOREIGN PATENT DOCUMENTS

| JP | 61-254220 A | 11/1986 |
| JP | 63-252528 A | 10/1988 |

(Continued)

OTHER PUBLICATIONS

"Examination of Method for Optimizing CO2 Removal and Concentration System in Combustion Exhaust Gas Using Honeycomb Adsorbent", Journal of Chemical Engineering, vol. 33, pp. 218-229, 2007.
International Search Report dated Feb. 19, 2019, in corresponding International Patent Application No. PCT/JP2019/002748.
Written Opinion of the International Searching Authority dated Feb. 19, 2019, in corresponding International Patent Application No. PCT/JP2019/002748.

*Primary Examiner* — Anita Nassiri-Motlagh
(74) *Attorney, Agent, or Firm* — Staas & Halsey LLP

(57) ABSTRACT

A honeycomb rotor recovery and concentration device recovers carbon dioxide gas from flue gas and the like. A carbon dioxide sorption honeycomb rotor is rotated in a casing that is separately sealed at least into a sorption zone and a desorption zone, and the honeycomb in the sorption zone is brought into contact with a raw material gas containing carbon dioxide in a wet state to sorb carbon dioxide gas. A desorption circulation circuit circulates from an outlet to an inlet of the desorption zone. Water supplied to a heater in the circuit is evaporated to form saturated steam, which is supplied to the desorption zone. In the desorption zone, carbon dioxide gas is desorbed by contact with the saturated
(Continued)

steam. The design may make it possible to use low-temperature exhaust heat, and this may achieve reduction in size, high performance and high efficiency at the same time.

20 Claims, 7 Drawing Sheets

(52) U.S. Cl.
CPC .................. *B01D 2253/108* (2013.01); *B01D 2253/3425* (2013.01); *B01D 2257/504* (2013.01); *B01D 2257/80* (2013.01); *B01D 2258/0283* (2013.01)

(58) Field of Classification Search
USPC ........................................................ 423/228
See application file for complete search history.

(56) References Cited

FOREIGN PATENT DOCUMENTS

| | | |
|---|---|---|
| JP | 4-83509 A | 3/1992 |
| JP | 6-91128 B2 | 4/1994 |
| JP | 2001-205045 A | 7/2001 |
| JP | 2003-181242 A | 7/2003 |
| JP | 2015-507527 A | 3/2015 |
| JP | 2016-117052 A | 6/2016 |
| JP | 2016-175014 A | 10/2016 |
| JP | 2018-61917 A | 4/2018 |
| JP | 6408082 B1 | 10/2018 |
| JP | 2019-13906 A | 1/2019 |
| WO | WO 2014/208038 A1 | 12/2014 |

\* cited by examiner

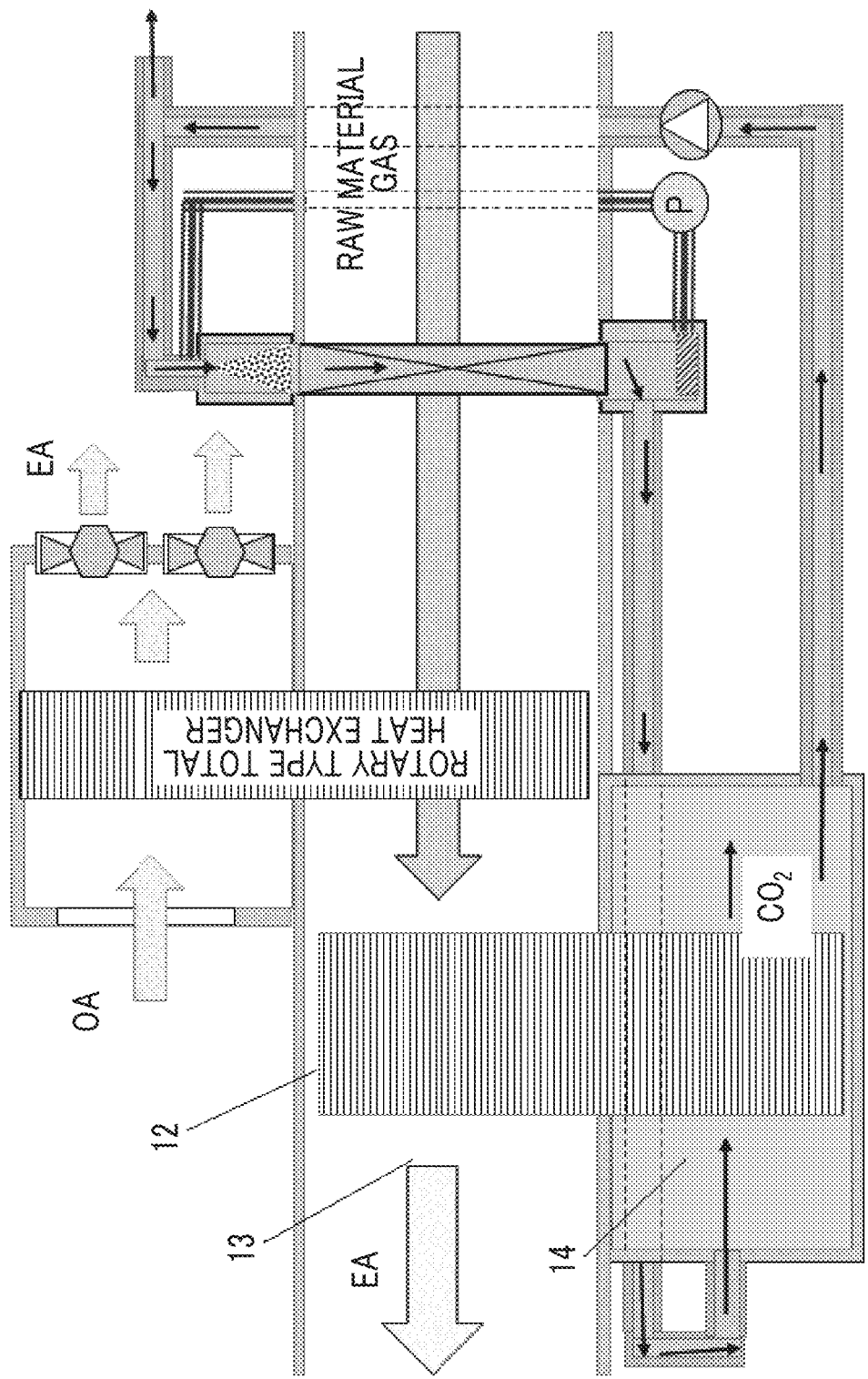

GAS RECOVERY AND CONCENTRATION DEVICE

CROSS REFERENCE TO RELATED APPLICATIONS

This application is a U.S. National Stage Application, which claims the benefit under 35 U.S.C. § 371 of International Patent Application No. PCT/JP2019/002748 filed Jan. 28, 2019, which claims the foreign priority benefit under 35 U.S.C. § 119 of Japanese Patent Application No. 2018-060998 filed Mar. 28, 2018, the contents of which are incorporated herein by reference.

BACKGROUND

The inventor's proposal relates to a thermal swing carbon dioxide recovery and concentration device that can perform recovery at a high recovery rate, can perform concentration to a high concentration, can be miniaturized, has high durability, can use waste heat of 100° C. or less, and has low energy consumption.

As a measure against global warming, efforts are being made at a global level to reduce carbon dioxide discharged from industry, automobiles, and consumers as much as possible. For example, the development of energy-saving equipment and the promotion of the development of renewable energies such as sunlight and wind power are being carried out. In addition, the field of power generation, technologies for improving power generation efficiency of thermal power plants, technologies for recovering and concentrating carbon dioxide discharged from thermal power plants, and storing thereof in the ground or in the deep sea, for the future, and the like are being researched and developed.

Among the efforts described above, the inventor's proposal particularly relates to a technology for recovering and concentrating carbon dioxide from gas discharged from a thermal power plant, a combustion furnace, or the like.

As the thermal power plant, those using petroleum, natural gas, or coal as fuel are the most widespread, and others include those incinerating garbage discharged from cities. Among such thermal power plants, those using coal as fuel have the following features. That is, fuel is inexpensive, global coal reserves are greater than petroleum, reserves are also located all over the world and thus easily obtainable, and therefore it is possible to reliably supply power.

However, coal has a problem in that coal discharges more carbon dioxide during combustion than petroleum and natural gas and also contains more sulfides. In addition, not only coal but also heavy petroleum had the same problems as coal. For this reason, in a power plant using coal or heavy petroleum as a fuel, a device for removing sulfur oxides or nitrogen oxides is provided to prevent environmental pollution.

However, although sulfur oxides or nitrogen oxides were removed to prevent environmental pollution, there was still a problem in that a large amount of carbon dioxide was discharged and the global warming was accelerated.

As a remedial measure, technologies for separating, recovering, and concentrating carbon dioxide in exhaust gas, and storing the recovered carbon dioxide in the ground or in the deep sea have been researched and developed. As means for separating, recovering, and concentrating the carbon dioxide, various methods such as a deep cooling method, an absorption method, an adsorption method, and a membrane separation method are suggested.

The deep cooling method is a method in which a raw material gas is pressurized and carbon dioxide is liquefied and separated by using a difference in liquefaction temperature of each gas under pressurization. Since a power of a compressor compressing gas and a power of a freezer performing deep-cooling are required, for example, in a case where the carbon dioxide concentration is around 10%, other 90% of gas, other than carbon dioxide, that does not need to be recovered should be compressed and cooled deeply together, and thus there is a disadvantage that energy consumption becomes excessive.

The absorption method is a method in which carbon dioxide is absorbed in an amine-based alkaline solution such as monoethanolamine, recovered, and heated to desorb and concentrate the carbon dioxide. Although the method is already practically used, an expensive material with high corrosion resistance is required for handling the alkaline solution, which causes high cost. In addition, a concentration of an amine aqueous solution is around 30% and water is around 70%, and the heat capacity of the liquid to be handled is enormous. Therefore, even if a heat exchanger is arranged at a key point and heat is recovered, the limit of energy saving is approaching the limit. In addition, since monoethanolamine or the like is a chemical that vaporizes, there is a concern of secondary pollution due to exhaustion thereof into the atmosphere.

In the adsorption method, a gas adsorbent such as zeolite or activated carbon is used, and examples thereof include a pressure swing method (hereinafter, PSA method) that absorbs and desorbs using a pressure difference, and a thermal swing method (hereinafter, TSA method) that absorbs and desorbs using a temperature difference. The PSA method is a method in which, using a principle that an amount of adsorbed carbon dioxide changes by pressure, only carbon dioxide is adsorbed by pressurization, and depressurized to desorb, separate, and recover the carbon dioxide. A pressure-resistant container is required, and precision machines such as solenoid valves, compressors, and vacuum pumps are also required as peripheral equipment, which makes it difficult to increase the size. In addition, there is a problem in that exhaust heat cannot be used, and the method has to rely on all expensive electric energy.

The TSA method is a method in which carbon dioxide is adsorbed at a temperature of 50° C. (hereinafter, temperature is all referred to as "Celsius") or less, and the temperature is heated to a temperature of around 100° C. to 200° C. to desorb and recover the carbon dioxide. In a multi-tower system, in which a plurality of adsorption towers filled with an carbon dioxide adsorbent are alternately switched between adsorption and regeneration, there are disadvantages that gas pressure loss is high, fluctuations in concentration and pressure due to tower switching are inevitable, and thus it is difficult to increase the size. In addition, although exhaust heat can be used, there is a problem in that valuable exhaust heat that can be converted to steam power is used and thus the running cost cannot be ignored.

Among the TSA methods, there is shown a method capable of reducing pressure loss or increasing the size by using a rotary adsorption honeycomb rotor in Patent Documents 3 to 5. However, it is not sufficient in terms of the recovery rate of carbon dioxide, the concentration of concentration, and energy saving properties of recovered energy.

SUMMARY

The inventor's proposal relates to a method for recovering and concentrating carbon dioxide, and suggests a thermal swing carbon dioxide recovery and concentration device that can perform recovery at a high recovery rate, can perform concentration to a high concentration, can be miniaturized, has high durability, has high energy saving properties by being efficiently used in regenerating waste heat of around 100° C.

Patent Document 1, Japanese Patent Publication No. 4-83509, and Patent Document 2, Japanese Patent Publication No. 6-91128, disclose a method in which, by using a rotor of a cylindrical container in which particulate carbon dioxide adsorbents are divided and accommodated in a baguette-shaped container, carbon dioxide is adsorbed in an adsorption zone by rotating the rotor or a duct device, and a high-concentration carbon dioxide is desorbed and recovered by heated gas in a desorption zone.

In this technology, gas pressure loss is high, and energy saving properties are not considered. Patent Document 2 discloses a method for using heat of raw material gas as a heat source of desorption gas of carbon dioxide, but energy saving properties of a recovery and concentration device itself is not considered.

Patent Document 3, Japanese Patent Publication No. 2001-205045, suggests a rotor having a honeycomb structure, and pressure loss is reduced. In addition, there is disclosed a flow in which the rotor sequentially goes through an adsorption zone, a desorption zone by heated carbon dioxide gas, a gas purge zone, a regeneration cooling zone (hereinafter, indicated as cooling zone), and then returns to the adsorption zone again, in accordance with the rotation. At a stage of passing through the desorption zone and moving to the next zone, in a case where high-concentration carbon dioxide gas contained in the honeycomb gap moves to the next zone due to the rotation of the rotor, and the next zone is the cooling zone, the high-concentration gas is discharged to the cooling zone to reduce the carbon dioxide recovery rate. As a measure against this, a purge zone is provided.

In addition, even after passing through the purge zone after the desorption zone, the honeycomb remains at a high temperature as it is due to heat storage, and thus adsorption power of carbon dioxide is weak. Therefore, even if raw material gas is caused to flow here, the raw material gas flows without carbon dioxide gas being adsorbed. With this, a cooling zone is provided before the adsorption zone, and is configured such that the gas moves to the adsorption zone after cooling the honeycomb. In this manner, it is possible to increase the carbon dioxide recovery rate.

There have been studies that in the desorption zone, a circulation circuit for circulating a gas heating coil and the desorption zone is configured, and the heat of the high-temperature gas discharged from a boiler or the like is recovered and used to improve energy saving properties. In addition, there have been studies that in the cooling zone, a circuit for circulating between the gas cooling coil and the cooling zone is configured to increase the cooling effect. However, since each has a large amount of circulating gas, there is a disadvantage that a larger-sized honeycomb rotor is required.

Patent Document 4, Japanese Patent Publication No. 2003-181242, suggests optimization of the whole system as an integrated system including a boiler, a desulfurization device, an eliminator, a honeycomb rotor dehumidifier, and a honeycomb rotor carbon dioxide recovery and concentration device. However, Patent Document 4 does not define over Patent Document 3 in relation to the carbon dioxide recovery and concentration device.

A carbon dioxide recovery and concentration device of FIG. 1 disclosed in Non-Patent Document 1, "Examination of Method for Optimizing $CO_2$ Removal and Concentration System in Combustion Exhaust Gas Using Honeycomb Adsorbent," Journal of Chemical Engineering, Vol. 33, pp. 218-229, 2007, is related to Patent Documents 3 and 4, in which a carbon dioxide adsorption honeycomb rotor 1 is driven by a rotor driving motor 2 to rotate thereof at a speed of several to several tens of rotations per hour via a rotor driving belt 3 (or chain). There is configured a cycle of returning to an adsorption zone 4 via the adsorption zone 4, an desorption zone 5, a gas purge zone 6, and a cooling zone 7 according to the rotation direction of the rotor 1. A circuit for circulating the cooling zone 7, the gas cooling coil 8, and the cooling gas blower 9 is configured. There is configured a circuit for circulating the desorption zone 5, a desorption gas heating coil 10, a desorption gas circulation blower 11.

The configuration of the carbon dioxide recovery and concentration systems disclosed in Patent Documents 3 and 4 and Non-Patent Document 1 will be described. Since the flue gas has a high temperature and a high humidity, and contains pollutant gases such as sulfur oxides, nitrogen oxides, and dusts, a pre-processing device as disclosed in Patent Document 4 such as a denitration device, a wet scrubber, a desulfurization device, a bag filter, and the like is provided to remove harmful gas or dust. Since zeolite preferentially adsorbs water vapor over carbon dioxide and carbon dioxide adsorption ability is reduced, using a honeycomb rotor supporting a zeolite-based adsorbent in carbon dioxide concentration, as disclosed in Patent Document 4, in the pre-processing by a honeycomb rotor dehumidifier, it is required to perform dehumidification at a dew point temperature of −20° C. to −60° C. and to introduce thereof.

The operation of the example in the related art having the above configuration will be described below. The raw material gas obtained by pre-processing the flue gas is introduced into the adsorption zone 4, the honeycomb adsorbs carbon dioxide to reduce the concentration, and joins and is mixed with the outlet air of the cooling zone 7. The joined gas is cooled passing through the gas cooling coil 8 by the cooling gas circulation blower 9 and is introduced into the cooling zone 7. In the cooling zone 7, rotational move from the desorption zone 5 to the purge zone 6 is possible, and in order to recover the adsorption ability of the honeycomb which has not yet recovered the carbon dioxide adsorption ability due to the high temperature, the honeycomb is cooled in the cooling zone 7.

Adsorption of carbon dioxide also proceeds in the cooling zone 7. As for the gas circulating in the cooling zone 7, a gas having a volume obtained by removing recovered carbon dioxide from the raw material gas introduced from the adsorption zone 4 becomes excess, is discharged to the outside, and is discharged to the atmosphere.

In the desorption gas circulation circuit, high-concentration carbon dioxide gas is heated to 140° C. to 220° C. by the desorption gas heating coil 10 and introduced into the desorption zone 5, and the honeycomb is heated to desorb carbon dioxide adsorbed on the honeycomb. That is, the gas that has left the desorption zone 5 returns to the desorption gas heating coil 10 again by the desorption gas circulation blower 11 and circulates. However, the gas in the circulation circuit is increased by the desorbed carbon dioxide gas, and the increased volume is taken out of the circulation circuit is recovered. In this method, the heated carbon dioxide gas desorbs carbon dioxide gas, and thus complete desorption is difficult. Therefore, this is also a factor of increasing the size of the rotor.

In a honeycomb rotor dehumidifier and a honeycomb rotor VOC (volatile organic solvent) concentration device, heated air is introduced into the desorption zone, and the water vapor or VOC adsorbed on the honeycomb is desorbed on the air which is carrier gas. However, in a case where air is used as the carrier gas in the carbon dioxide concentration device, the concentration of recovered carbon dioxide will be reduced. For this reason, high-concentration carbon dioxide gas is used for desorption. A completely different concept is required for a honeycomb rotor dehumidifier or a honeycomb rotor organic solvent concentration device.

In the purge zone 6, the high-concentration carbon dioxide gas contained in the gap of the honeycomb that has been rotationally moved from the desorption zone 5 is purged and returns to the desorption zone 5, thereby preventing outflow of the recovered carbon dioxide. A part of the cooling gas is used as purge gas, but a raw material gas may be used. This gas purge has an effect of increasing the carbon dioxide recovery rate.

In a case where the purge gas amount is further increased, desorption of a substance to be adsorbed is promoted in the gas purge zone 6 by using preheating, and there is an energy saving effect by further recovering heat in the purge zone 6 and reusing thereof in the desorption zone 5. This flow is frequently used in a rotor type dehumidifier and a rotor type organic solvent concentration device. However, in a case of the carbon dioxide concentration device that is being a subject of the present inventor's proposal, a use method, in which a gas having a low carbon dioxide concentration is introduced into the desorption circuit, the recovered concentration of carbon dioxide is reduced, and the purge gas amount is increased, thereby exhibiting an energy saving effect, does not work.

In addition, as another problem, in the cooling zone, in order to cool the honeycomb heat storage immediately after regeneration and to remove the adsorption heat generated by the adsorption of carbon dioxide at the time of passing through the cooling zone, the circulating cooling gas which is 4 to 6 times the amount of the processing gas should be made to flow, and there is a defect that the amount of cold water to be supplied to a gas cooler or the power consumption of the circulation blower becomes great and the size of the rotor is increased.

In addition, the desorption gas needs to be circulated approximately twice as much as the raw material gas amount. There is a problem in that a large rotor having a volume of 5 times or more and a rotor diameter of 2.2 times or more with respect to the same processing (raw material) gas amount is required, compared to a rotor diameter of the honeycomb rotor organic solvent concentration device as shown in Table 1.

TABLE 1

Comparison of rotor diameter with respect to processing flow rate (a unit of flow rate Nm3/h)

| | Dehumidifier | VOC concentration device | Conventional $CO_2$ concentration | New $CO_2$ concentration |
|---|---|---|---|---|
| Zone ratio Regeneration:cooling:processing | 1:1:3 | 1:1:10 | 2.5:5:1 | 1:0.5:10 |
| Processing zone flow rate | 70,000 | 70,000 | 70,000 | 70,000 |
| Regeneration zone flow rate | 23,300 | 7,000 | 170,000 | 7,000 |
| Purge zone flow rate | 23,300 | 7,000 | 700 | |
| Cooling zone flow rate | | | 330,000 | |
| Total gas flow rate | 116,600 | 84,000 | 570,000 | 70,000 |
| Regeneration temperature (° C.) | 140~220 | 180~200 | ~220 | 100 |
| Rotor diameter conversion (M) | φ 4.54 m | φ 3.85 m | φ 10.0 m | φ 3.85 m |

As described above, the carbon dioxide recovery and concentration device has four tasks of improving a concentration of concentration, improving a recovery rate at the same time, reducing the size of the device, and dramatically reducing energy consumption. It is common technical knowledge that it is possible to improve performance by providing a purge zone such as a honeycomb rotor VOC concentration device or a honeycomb dehumidifier, and pre-cooling the honeycomb. However, in the carbon dioxide recovery and concentration device, the level of heat that should be cooled and removed is required to be considered different.

The first reason is a problem of adsorption capacity. Since a much higher-concentration gas should be adsorbed compared to the rotor type organic solvent concentration device or the rotor type dehumidifier, an input amount of the adsorbent into the adsorption zone with respect to the processing gas amount becomes several times to several tens of times that of an organic solvent concentration device or a dehumidifier. In other words, a rotor having a volume several times to several tens of times that of the device in the related art is required for the amount of the raw material gas. Although there is a method to deal with the adsorption processing amount, in which a rotor rotation rate is increased to reduce the size, but, in order to remove heat storage of the honeycomb of which desorption has been completed, the method is completely insufficient as a purge cooling effect due to the raw material gas, and therefore, for the purpose, a cooling zone several times wider than that of the adsorption zone should be provided and cooling gas several times the adsorption gas should be circulated and cooled.

The second reason is the adsorption heat of carbon dioxide. In a case where carbon dioxide is adsorbed from the gas passing through the honeycomb, adsorption heat is generated, the temperature of gas or honeycomb is raised due to the adsorption heat, and the adsorption power of the adsorbent is decreased. The adsorption heat of carbon dioxide is about ⅙ to 1/7 of the adsorption heat of water vapor, but much higher-concentration carbon dioxide should be adsorbed compared to the organic solvent concentration device or the honeycomb rotor dehumidifier. Therefore, enormous adsorption heat is generated. In the honeycomb rotor type dehumidifier, it is possible to take measure in two stages in which, in a case of high humidity, a high-humidity area is pre-dehumidified using a cooling dehumidifier at the previous stage and then dehumidification is performed using a honeycomb rotor dehumidifier. However, in a case of carbon dioxide concentration, such a method is not possible.

For this reason, even if the cooling zone is sufficiently cooled, the adsorption capacity decreases by the temperature rise due to the adsorption heat in the adsorption zone, and the recovery rate and the concentration of concentration do not increase. For the above two reasons, a relatively large cooling zone is provided to remove heat storage and adsorption heat and circulating cooling is performed. However, as shown in Table 1, there are problems in that energy for cooling increases, the size of the rotor diameter is increased, and the device becomes excessively large.

From the analysis of the test result and the simulation result of Non-Patent Document 1, carbon dioxide recovery energy of the honeycomb rotor carbon dioxide recovery and concentration device is approximately 15 times the latent heat of vaporization of carbon dioxide, 369.9 kJ/kg, which is considered to be a measure of the carbon dioxide desorption energy. It is considered that approximately 80% to 90% of the thermal energy input to the desorption zone is input only to warm the honeycomb (the honeycomb substrate and the adsorbent and the binder that fixes the adsorbent). In the cooling zone, there is a vicious cycle of further increasing energy consumption in order to remove a huge amount of heat storage at this time as a trouble maker.

In the absorption method, carbon dioxide is absorbed by bringing about 30% of an aqueous amine solution into contact with raw material gas, but about 70% of the amine solution is water, and the density of water is approximately 800 times (1.251:1000 kg/m3) of nitrogen, which is a main component of the raw material gas, and the specific heat is approximately 4 times (4.187:1.038 kJ/kg·k). Therefore, the heat capacity per volume is approximately 3,200 times, and the heat capacity is extremely large. Therefore, the absorption heat of carbon dioxide has much smaller temperature rise than the above-described adsorption formula absorbed in water, and accordingly, has a small influence on raising a temperature of raw material gas and absorption solution and reducing the absorption amount. For this reason, the raw material gas is brought into contact with the absorption solution only once and most of carbon dioxide in the gas can be absorbed. Although this is an advantage of the absorption method, on the contrary, the heat capacity of the absorption solution is enormous, and thus there is also a disadvantage that the loss due to heating and cooling of the absorption solution increases.

As a method for solving the above problem, Patent Document 5, Japanese Patent Publication No. 61-254220, discloses a fixed-bed (floor) type carbon dioxide recovery and concentration technology for the purpose of removing carbon dioxide in a closed space such as a space station or a submarine. The carbon dioxide gas is adsorbed by passing processing gas through an adsorption tower accommodating an amine ion exchange resin or a carbon dioxide adsorbent such as activated carbon, and then the pipeline is switched to introduce and heat water vapor to desorb and recover the carbon dioxide. After the carbon dioxide is desorbed and recovered, the pipeline is returned again, and the processing gas flows to achieve an object at a continuous cycle in which carbon dioxide is adsorbed. It is also disclosed that when carbon dioxide is adsorbed, the adsorbent is cooled by evaporation of water condensed on the adsorbent at the time of desorption to promote adsorption.

Patent Document 6, International Publication No. WO 2014/208038, discloses a moving layer (bed) type carbon dioxide recovery and concentration technology. Carbon dioxide is adsorbed through the raw material gas into the adsorption tower accommodating the carbon dioxide adsorbent, and after the adsorption, the adsorbent is moved to a regeneration tower and heated with saturated water vapor to desorb and recover the carbon dioxide. In addition, the carbon dioxide adsorbent achieves an object at a continuous cycle in which the carbon dioxide adsorbent moves to the adsorption tower again through a drying tower and adsorbs carbon dioxide. In addition, it is also disclosed that the adsorption tower and the drying tower can be integrated.

In Patent Document 7, Japanese Patent Publication No. 2015-507527, a raw material gas is introduced into a bed (layer) of a weak basic ion exchange resin having an amine group to sorb carbon dioxide in the raw material gas, and hot water is directly injected into the bed (layer) in a desorption stage. Thereby, the temperature is raised to desorb and recover carbon dioxide. Subsequently, there is disclosed a method for continuously recovering carbon dioxide by lowering the temperature by directly injecting cold water into a bed (layer) and then returning to a stage of introducing the raw material gas again.

In the methods of Patent Documents 3 and 4 and Non-Patent Document 1, since a carbon dioxide gas having a small heat capacity is used as a heat medium for desorption, there is a problem in that the required amount of desorption gas becomes enormous and the size of the device is increased. On the contrary, Patent Documents 5 and 6 used the latent heat of condensation of water vapor, and Patent Document 7 analyzed that an increase in the size of the device was prevented based on the principle and the like that hot water having a heat capacity of approximately 500 times that of carbon dioxide gas was used.

In addition, in the methods of Patent Documents 3 and 4 and Non-Patent Document 1, a mixed gas having a small heat capacity is used for cooling the adsorbent after regeneration and removing adsorption heat of carbon dioxide gas. Therefore, in the cooling stage, a circulation amount of cooling gas becomes enormous, and an increase in the size of the device cannot be prevented. In order to solve this problem, Patent Documents 5 and 6 analyzed that water condensed on the surface of the carbon dioxide adsorbent in the regeneration stage can be removed by an effect of vaporizing cooling of adsorption heat generated in an adsorption stage of carbon dioxide due to evaporation of water, and an increase in the size is prevented. In addition, Patent Document 7 analyzed that a cooling stage of directly injecting water after the regeneration stage is provided, and that the problem does not come to the surface along with the vaporizing cooling effect of water. However, Patent Documents 5, 6, and 7 disclose defects due to use of a particulate adsorbent, that is, that a problem of airflow resistance of a particle layer, the difference between the external and internal particle adsorption/desorption rates, the capillary behavior of condensed water, or the processing gas rate due to fluidity of particles is limited. In addition, there are also many problems that cannot be resolved, such as need of intensity of particles.

In order to solve the above-described problem, Patent Document 8, Japanese Patent Publication No. 2019-013906, discloses that a honeycomb rotor supporting sorbent particles capable of sorbing carbon dioxide even when it is wet is partitioned into at least two sections of a sorption zone and a desorption zone, and a seal is provided, accommodated in a casing, and rotated. In the desorption stage, the honeycomb is heated with saturated steam to desorb carbon dioxide, and at the same time, a part of the saturated steam is condensed and remains on the honeycomb surface. In the sorption stage, there is disclosed a recovery and concentration device of carbon dioxide that exhibits a high sorption efficiency if the temperature rise is suppressed as shown in FIG. 2, by cooling sorption heat generated simultaneously with the sorption of carbon dioxide by the latent heat of evaporation of condensed water.

In Patent Document 8, saturated steam of 50° C. to 100° C. to be introduced into a desorption zone honeycomb is generated by a steam generator in the related art such as a boiler or a pan-type humidifier. However, since these saturated steam generators in the related art use a heat medium such as steam or hot water flowing through a heating pipe provided in a water tank to exchange heat and evaporate water, there was a problem in that the efficiency of a steam generation portion is poor and the size of the device is increased. In addition, the running cost of an electric heater is high, and even if a steam-heated pan-type steam generator uses useful high-pressure steam, there is no advantage of carbon dioxide recovery and concentration in terms of the running cost.

In a case where low-temperature exhaust heat of 100° C. or less with less usage is used, it is advantageous in terms of the running cost, but there was a problem in that it is difficult to generate saturated steam and the size of the saturated steam generator becomes large. The inventor's proposal relates to a method for efficiently generating saturated steam for desorption regeneration by using low-temperature exhaust heat, and a method for introducing and contacting saturated steam.

Saturated steam of 50° C. to 100° C. is basically a mixed gas with high-concentration carbon dioxide at atmospheric pressure. The saturated water vapor introduced into the desorption zone is cooled and condensed by heating the honeycomb and supplying desorption heat of carbon dioxide, and dew-condensed on the surface of the honeycomb or the sorbent. The surface of the sorbent returns to the adsorption zone while being wet with water derived from water vapor condensed in the desorption regeneration zone. However, but cooling of the honeycomb and the sorbent is promoted by the vaporizing cooling phenomenon of water when the raw material gas passes, and the sorption heat of carbon dioxide gas is removed instead of the latent heat of evaporation of water, thereby exhibiting the effect of capable of sorbing carbon dioxide gas with high efficiency.

As a solid water-insoluble amine-based carbon dioxide sorbent, in addition to basic ion-exchange resins or polymer gels having an amine group, an adsorbent in which absorbent such as an amine-based carbon dioxide absorbent or ion liquid, for example, ethanolamines or aminosilane, is additionally attached in pores can be used. In a case where the carbon dioxide sorption performance is impaired due to water infiltration of the adsorbent into the pores due to capillary force, the surface of the adsorbent can be made weakly hydrophobic to prevent water from entering the pores. However, since the pores are fine, it is possible to achieve the object by making them be weakly hydrophobic. Conversely, strong hydrophobicity is not desirable because condensed water avoids the surface of the sorbent and water droplets increase the size of the diameter, thereby reducing the vaporizing cooling effect. In the inventor's proposal, a honeycomb supporting carbon dioxide sorbent particles is used, and the reason is described below.

In a layer (bed) packed with a particulate adsorbent as shown in Patent Documents 5, 6, and 7, from the close-packing theory of spheres, at least 12 contact points between particles exist in one particle, from a viewpoint of close-packing theory. At the contact point, a capillary tube is formed, at the contact point, condensed water is drawn by the capillary force as shown in FIG. 3, the density of the condensed water is formed on the particle surface, and this has an adverse effect on the simultaneously proceeding phenomenon of carbon dioxide adsorption and water evaporative cooling phenomenon in the adsorption stage. That is, in a portion where the condensed water is coarse, the vaporized and cooled water is interrupted on the way, and in a portion where the condensed water in the site in contact with particles is dense, the start of adsorption is delayed due to the water film thickly covering the surface.

In Patent Document 6, a desirable water content of a layer (bed) is designated. However, water covering the surface in a large amount exceeding the water content that can be included in an ion exchange resin not only blocks normal gas passage as shown in FIG. 3 but also water is blown on a downstream side by the gas flow, and since it is difficult to control the water content to an assumed amount, the gas flow rate is limited. Considering the pressure loss, a practical range should be 1 m/s or less at a wind speed of the entire adsorption layer. In order to solve the above-described problems, Patent Document 8 suggests method and device that have a honeycomb rotor supporting fine particles of sorbent of 1 mm or less having a function of adsorbing or absorbing contaminants such as carbon dioxide and VOC gas in a wet stat, sorb carbon dioxide gas in exhaust gas, and regenerate with saturated water vapor at 50° C. to 100° C. in a desorption regeneration zone.

In a case where a raw material gas containing carbon dioxide is caused to flow through the sorption zone to cause carbon dioxide to be sorbed on the honeycomb, if the temperature of the sorbent or the raw material gas rises due to sorption heat, the amount of sorption decreases as shown in FIG. 2. However, Patent Document 8 discloses that, by removing the sorption heat generated by sorption of carbon dioxide by evaporative cooling of water on a honeycomb surface that simultaneously proceeds, the temperature rise of the honeycomb or the raw material gas is suppressed, and carbon dioxide gas is sorbed with high efficiency as shown in FIG. 4. FIG. 5 shows changes in temperature and humidity on the psychrometric chart during carbon dioxide absorption (sorption). For example, in a concentration method using a zeolite rotor in the related art, since the temperature rises from processing gas 0 (zero) to 55° C. of (1) due to adsorption heat of carbon dioxide and the like, three times of cooling circulation of 0→(1)→0→(2)→0→(3) of performing cooling through a cooling coil is required. However, in an vaporizing cooling sorption method of the inventor's proposal, the adsorption heat from three times of circulation processing in the related art is converted into latent heat and removed through only one time of A→B, and the temperature is raised to 45° C. and maintained so that sorption performance is remarkably improved. In addition, there is also an effect of increasing the durability of an amine sorbent having low heat resistance.

The honeycomb that sorbed carbon dioxide moves to the desorption zone by rotation of the rotor, a mixed gas of carbon dioxide gas and saturated water vapor is introduced in the desorption zone, and the honeycomb and sorbent are heated by the saturated steam and desorbed to recover carbon dioxide gas.

Since saturated steam near 100° C. has enthalpy of 100 or more times the atmosphere or carbon dioxide gas of the same 100° C., it is not required to perform circulation while re-heating a large amount of carbon dioxide gas for desorption of carbon dioxide gas as shown in FIG. 1. Since water vapor having large heat capacity requires a small introduction volume, the desorption zone can be made small, and the power loss of saturated steam and carbon dioxide gas for desorption is small. The water vapor is cooled by heating of the honeycomb and the desorption heat of carbon dioxide, and condensed on the surface of the honeycomb and the sorbent. However, in order to generate saturated steam for desorption and regeneration, in general, saturated steam is generated by performing heating with a heating coil such as electric heating coil, steam coil, and hot water coil provided in a water tank, the running cost becomes excessively great since electricity or high-pressure steam are other valuable heat sources that are available. However, it is practically difficult to efficiently generate a large amount of saturated steam at 50° C. to 100° C. and effectively introduce and contact thereof, using low-temperature exhaust heat such as hot water which is lower in grade than high-pressure steam and has less usage.

In order to solve the above-described problems, the inventor's proposal relates to a method for effectively generating saturated steam for desorption and regeneration using low-temperature exhaust heat of 100° C. or less, of a device for recovering and concentrating carbon dioxide gas, and a device capable of being reduced in size. A circulation circuit is formed between a desorption regeneration inlet side and a desorption regeneration outlet side, and a blower and a heat exchanger of circulation gas and low-temperature exhaust heat are disposed in the middle of the circulation circuit. Exhaust gas at a temperature of 100° C. or lower or hot water flows on a high-temperature side of the heat exchanger. Or, a method of disposing a condensation coil of a heat pump is also possible. While circulating the carbon dioxide gas in the low-temperature side circulation circuit with the blower, water is directly sprayed or dropped in the low-temperature side heat exchanger as a heater at the same time, and saturated steam obtained by evaporating water film generated on the circulation gas side heat transfer surface is introduced from the desorption regeneration inlet. Water that has not been evaporated in the heat exchanger is recovered and supplied to the heat exchanger again for reuse.

While circulating gas in the regeneration circuit, not heating water in the entire humidification tank as in a steam boiler or pan-type humidifier, water on a circulation gas side of the heat exchanger is directly sprayed or dropped, water film generated on a heat transfer surface is heated and evaporated, and rising is quick and controllability is also favorable. In addition, since there occurs a case where exhaust gas of about 100° C. of which size is easily reduced and use is limited, hot water of low-temperature exhaust heat, or exhaust heat of a heat pump also effectively generates saturated steam, the running cost is suppressed.

The reason why saturated steam is generated while circulating the gas in the regeneration circulation circuit with a blower will be described below. Since the steam of 100° C. or more is 100% water vapor, water vapor in contact with the honeycomb in the regeneration and desorption zone is condensed and significantly reduced in volume to a negative pressure, and thereby high-pressure steam is continuously supplied. However, the saturated steam of 50° C. to 100° C. according to the inventor's proposal is formed of a mixed gas of carbon dioxide gas and saturated water vapor, and the saturated steam is condensed into the honeycomb and reduced in volume at the time of regeneration and desorption. However, since the volume of carbon dioxide desorbed from the honeycomb and carbon dioxide contained in the saturated steam increases together, the inside of the honeycomb is filled with the carbon dioxide gas, and the continuous introduction of the saturated steam is inhibited. With this, by circulating a mixed gas of carbon dioxide gas and saturated steam with a blower provided in the regeneration circulation circuit, saturated steam is effectively introduced into the honeycomb, and high-concentration carbon dioxide gas is desorbed. In a case where the excess amount exceeding the circulation circuit volume is taken out and cooled, water vapor is condensed and high-concentration carbon dioxide gas is recovered.

A circulation circuit is formed between the desorption regeneration inlet side and the desorption regeneration outlet side, a blower and a heat exchanger are disposed in the middle of the circulation circuit, and exhaust gas or hot water of about 100° C. is caused to flow onto the high-temperature side of the heat exchanger. While circulating carbon dioxide gas on the low-temperature side gas circulation circuit side with the blower, water in the low-temperature side heat exchanger as a heater is directly sprayed or dropped at the same time, and saturated steam obtained by evaporating the water film generated on the heat transfer surface is introduced from the desorption regeneration inlet. Water that has not been evaporated in the heat exchanger is recovered and supplied to the heat exchanger again for reuse. The saturated steam introduced into the honeycomb consumes energy for heating of the honeycomb and the desorption heat of carbon dioxide, and absorbs moisture or is dew-condensed or condensed on the surface inside the honeycomb. Since saturated steam has energy several ten times to several tens of times that of dry air, the introduction amount of saturated steam can be desorbed and regenerated in equal to or less than one-tenth of the processing air, and it is possible to make the rotor and the entire device compact. In addition, since low-temperature exhaust heat can be used, energy saving properties is also improved. It is also possible to introduce a condensation coil of a heat pump into the heat exchanger.

Although the honeycomb and the sorbent immediately after moving to the sorption zone are wet for the above-described reason, in a case where a raw material gas having a dew point temperature of 20° C. or less flows, the temperature rises due to the heat storage of the honeycomb or the sorption heat of carbon dioxide and the relative humidity decreases. Therefore, water is strongly cooled by the evaporative cooling phenomenon of water, and the sorption of carbon dioxide gas starts. In order to effectively use the evaporative cooling effect of the raw material gas, it is desirable to cool and dehumidify the raw material gas. However, as in the case where synthetic zeolite shown in Patent Documents 3 to 5 and Non-Patent Document 1 is used, it is not required to perform dehumidification to a minus dew point, and is favorable at a dew point temperature of 10° C. to 20° C. Therefore, it can be achieved even in the intermediate period in a case where the raw material gas is cooled and dehumidified with an indirect vaporizing cooler that supplies water to the outside air. Therefore, the pre-processing device for the raw material gas is simple, an exclusive low-dew-point dehumidifying device as disclosed in Patent Document 4 is not required, and the initial cost and the running cost can be also suppressed.

In the methods of Patent Documents 3 to 5 and Non-Patent Document 1, adsorption heat is generated by the adsorption of carbon dioxide, the temperature of the gas and the honeycomb becomes high, and the adsorption amount decreases. However, according to the method of the inventor's proposal, as long as the honeycomb is wet with water, vaporizing cooling phenomenon by raw material gas continues, and thus sorption heat is converted into vaporized heat and effectively cooled, and high adsorption performance is maintained as shown in FIG. 2. Incidentally, the latent heat of vaporization of 369.9 kJ/kg to the latent heat of sublimation of 573 kJ/kg, which is considered to be a measure of the sorption heat of carbon dioxide. Since the latent heat of evaporation of water is 2,500 kJ/kg, it is calculated that the sorption heat of about 4 to 5 kg of carbon dioxide can be removed by the evaporation of 1 kg of water that is attached or absorbed to the honeycomb and the sorbent.

In FIG. 1, since the amount of adsorption per pass decreases due to the temperature rise due to the adsorption heat, processing gas should be passed 4 to 7 times while re-cooling. However, according to the method of the inventor's proposal, since the sorption heat is strongly cooled by the vaporizing cooling phenomenon of water, most of the carbon dioxide can be sorbed in a single pass, and the sorption zone is equal to or less than one-fourth of Non-Patent Document 1. Therefore, as the "new CO2 concentration" of Table 1, the rotor size can be dramatically reduced. In addition, the power cost or the initial cost of the processing gas circulation blower and the regeneration gas circulation blower can be dramatically reduced.

In addition, there is an effect of improving durability as an effect in terms of long-term operation. Aminosilane-based, solid amine-based carbon dioxide sorbents or amine-based ion-exchange resins can withstand heat up to 100° C. without oxygen, but in gas containing oxygen, even at 50° C. to 60° C., there is an example of being remarkably deteriorated. In the proposed method, the temperature of the amine-based sorbent at the time of sorption is suppressed to 40° C. or less, and at the time of desorption, the temperature becomes 60° C. to 100° C. However, since there is almost no oxygen, oxidation deterioration is prevented and durability is improved.

BRIEF DESCRIPTION OF THE DRAWINGS

These and/or the other aspects and advantages will become apparent and more readily appreciated from the following description of the embodiments, taken in conjunction with the accompanying drawings.

FIG. 9 is a flow chart of Example 4 of the proposed carbon dioxide recovery and concentration device.

DETAILED DESCRIPTION OF THE PREFERRED EMBODIMENTS

Figure 1:
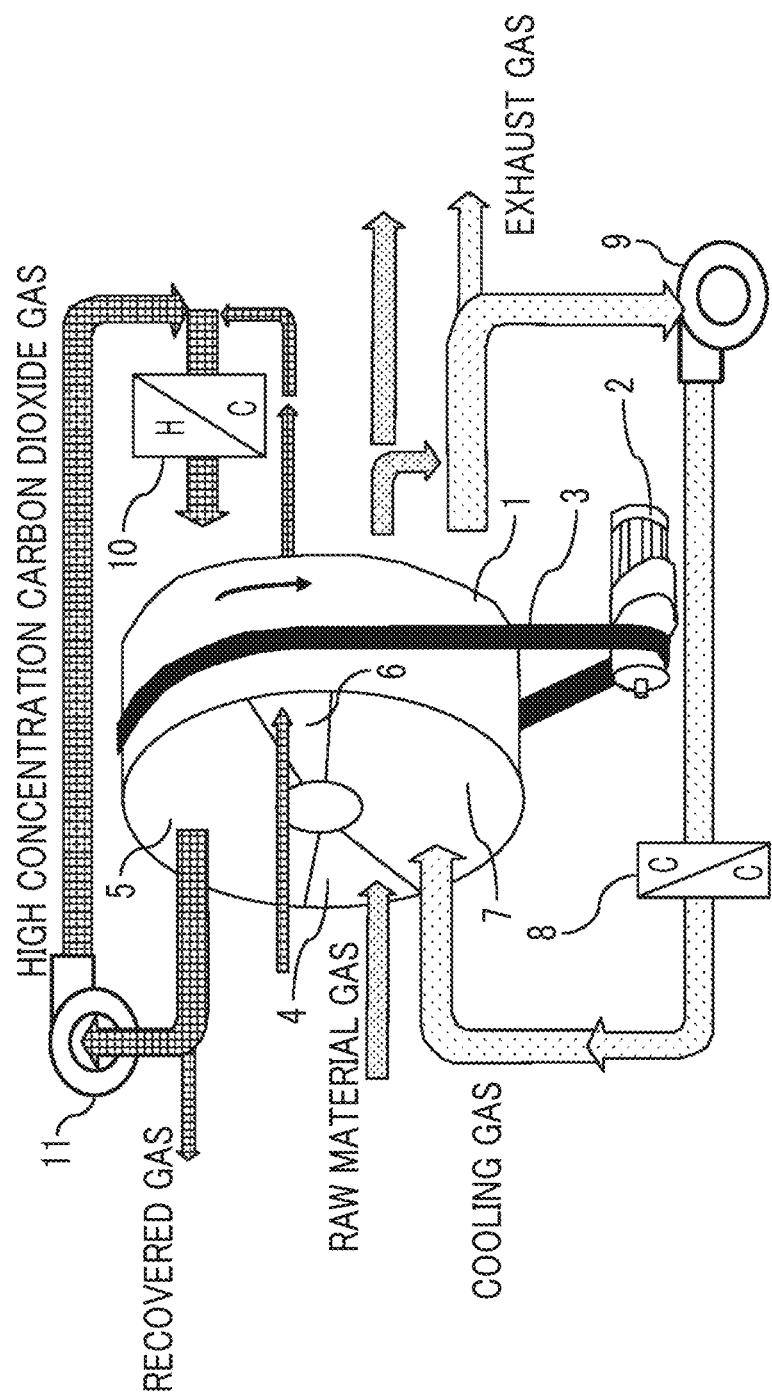
FIG. 1 is a flow chart of an example in the related art of a honeycomb rotor type carbon dioxide recovery and concentration device disclosed in Non-Patent Document 1.

Reference will now be made in detail to the embodiments, examples of which are illustrated in the accompanying drawings, wherein like reference numerals refer to the like elements throughout. The embodiments are described below to explain the present invention by referring to the figures.

As a basic embodiment, either a disk-shaped or hollow cylindrical rotor can be used, and there is an advantage that since the sorption honeycomb moves to a next stage by rotation of the rotor, the structure or switching is easily controlled, and the size is easily reduced.

The inventor's proposal will be described with a honeycomb rotor type. Using a rotor supporting a water-insoluble solid amine such as an ion exchange resin having an amine group in a honeycomb formed of an inorganic fiber sheet, a metal sheet, or a plastic sheet, the honeycomb passes through a sorption zone and a carbon dioxide desorption zone due to saturated water vapor and returns to the sorption zone again along the rotation direction of the rotor.

Since the flue gas has a high temperature and a high humidity and contains pollutant gases such as sulfur oxides, nitrogen oxides, and dust, a pre-processing device as disclosed in Patent Document 4, such as a denitration device, a wet scrubber, a desulfurization device, and a bag filter, and harmful gas or dust is removed and processed to obtain a raw material gas.

A raw material gas containing carbon dioxide flows to the sorption zone to sorb carbon dioxide on the honeycomb. The honeycomb sorbed with carbon dioxide moves to the desorption zone by rotation of the rotor, and steam is introduced. The honeycomb is directly heated by saturated water vapor containing carbon dioxide, and the water vapor is condensed on the honeycomb surface. The carbon dioxide gas desorbed by the heat of condensation is recovered. Subsequently, the honeycomb rotor rotates again from the desorption zone to the sorption zone. In the sorption zone, the raw material gas flows into the honeycomb flow path again and the sorption of carbon dioxide gas starts.

In order to use the above-described vaporizing cooling effect in the sorption zone, it is better to cool down and dehumidify to some extent, but it is not required to lower the temperature to a minus dew point. The flue gas is still hot and humid after denitrification and desulfurization by a general method. However, it is comparatively easily achieved by a method of cooling and dehumidifying the flue gas to about 10° C. to 20° C. using an indirect vaporizing cooler that exchanges heat with cold water of the cooling tower or the outside air, or sprays water on the outside air side, and decreasing the dew point temperature to 10° C. to 20° C.

Figure 2:
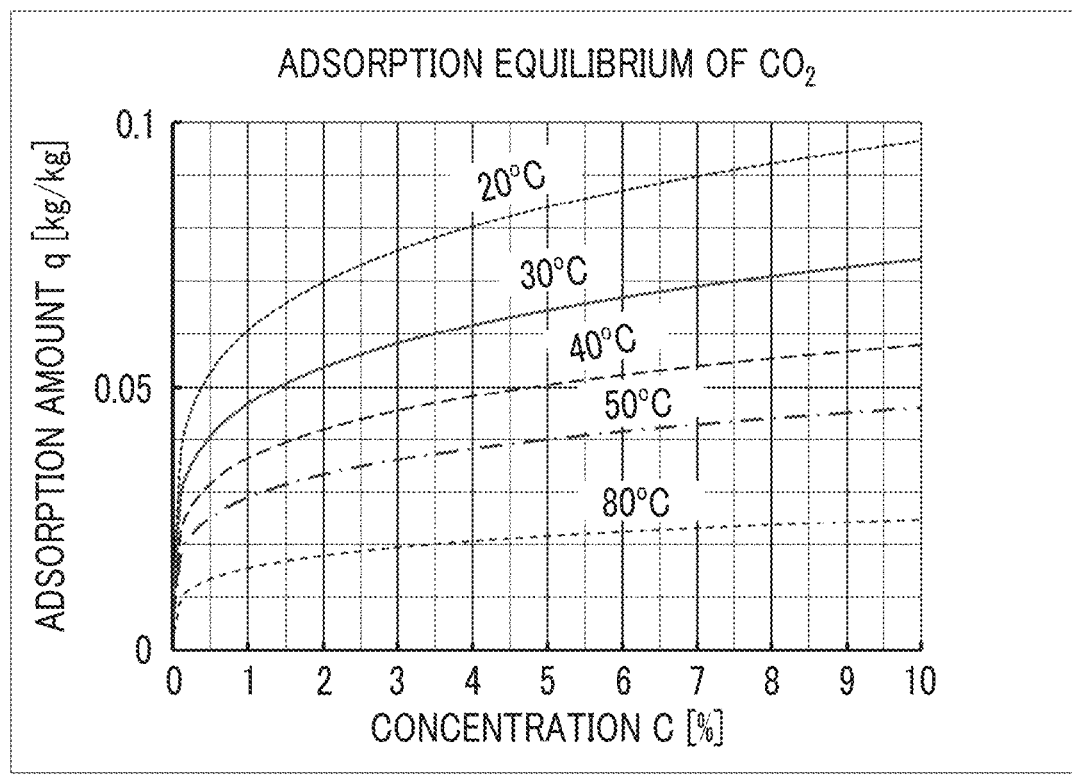
FIG. 2 is a carbon dioxide adsorption equilibrium diagram of a solid amine sorbent.
Figure 3:
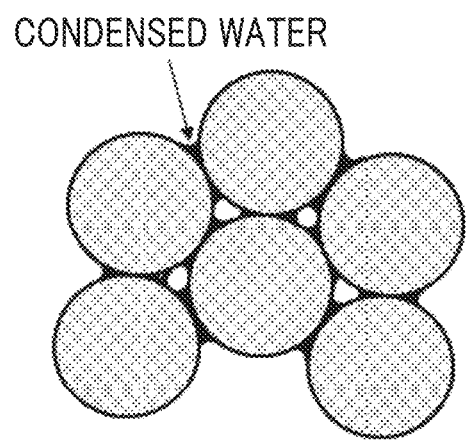
FIG. 3 is a diagram showing condensed water condensed at a contact point of a particulate adsorbent of an example in the related art.
Figure 4:
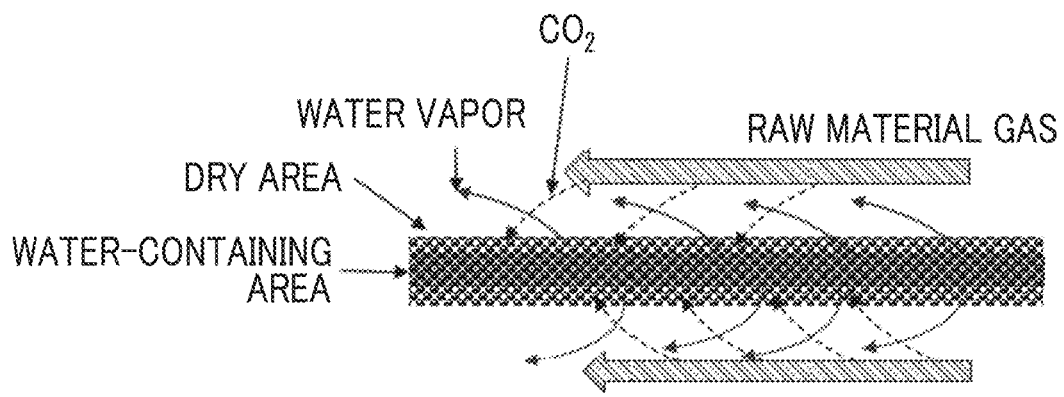
FIG. 4 is an image diagram of sorbing carbon dioxide at a high efficiency while evaporating water from a wet adsorbed honeycomb.
Figure 5:
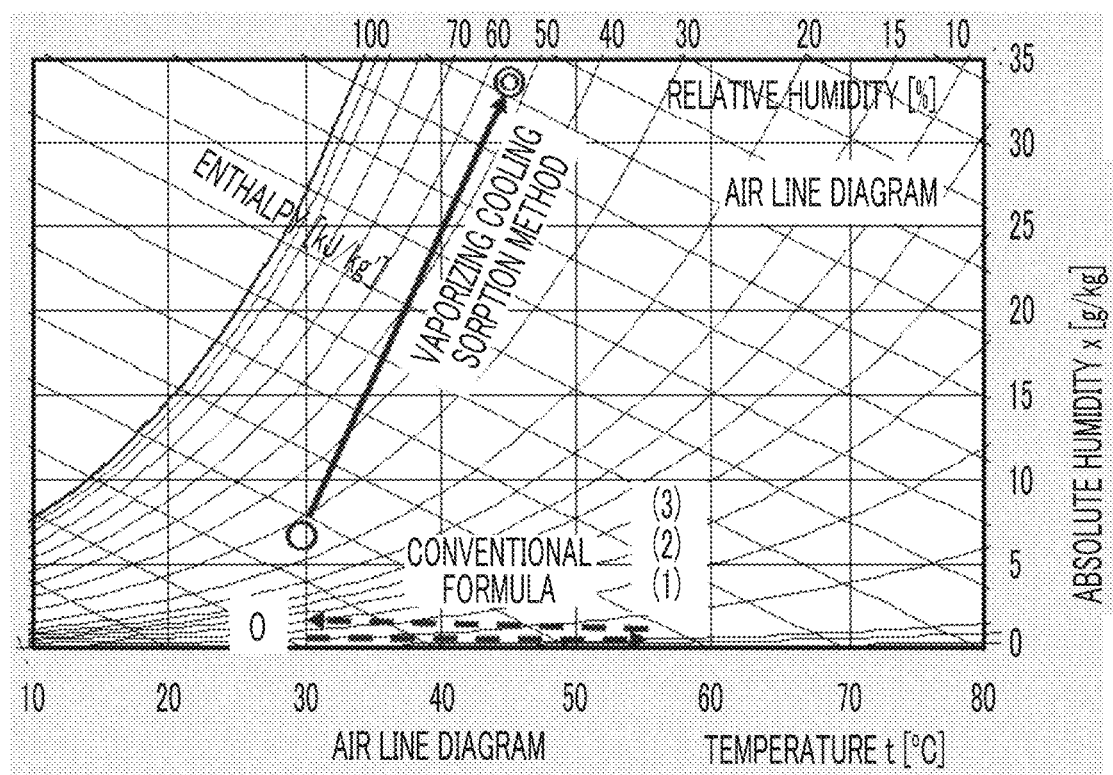
FIG. 5 is a diagram showing changes in temperature and humidity on a psychrometric chart during carbon dioxide absorption (sorption).

In order to cool and dehumidify processing gas, a heat exchanger or a cooler is required, and the energy consumption slightly increases. However, in a case where a rise in the temperature of the processing gas is suppressed, the adsorption capacity of solid amine can be dramatically increased as shown in FIG. 2. It is almost practically impossible to increase the adsorption amount of an adsorbent adsorbed by two times, but it is substantially possible to increase adsorption capacity by two times by reducing the gas temperature and suppressing the temperature rise during sorption by the vaporizing cooling effect. As described above, it is possible to dramatically improve performance of a carbon dioxide recovery and concentration device, to reduce a size of the device, and, as a result, to reduce a size of the entire system and to reduce energy consumption by cooling and dehumidifying the raw material gas.

In power plants or garbage incineration plants, reduction in energy consumption is obtained by recovering and reusing the waste heat as much as possible, but low-temperature exhaust heat such as hot water is limited in use. A method of using the low-temperature exhaust heat and doubling the capacity of the entire system has also an advantage in terms of overall energy saving. Excessive low-temperature exhaust heat may be used for cooling and dehumidifying the processing air by using an absorption type refrigerator or an adsorption refrigerator. Since these refrigerators can use low-temperature exhaust heat of 100° C. or less which cannot be used for desorption of amine type and of TSA type as shown in Patent Documents 3 to 5 and Non-Patent Document 1, reduction in cost of carbon dioxide recovery and concentration can be achieved.

As a saturated steam generation method of this case, a circulation blower is provided as a circulation circuit that connects the inlet and the outlet of the desorption regeneration zone, and the desorption gas containing carbon dioxide as a main component is circulated. A heat exchanger is provided in the circulation circuit, exhaust heat such as exhaust gas or hot water is passed to the high-temperature side, water is directly sprayed or dropped into the low-temperature side of the heat exchanger, that is, the heat exchange on the circulation circuit side, and the water film generated on the heat transfer surface is heated and evaporated to effectively achieve generation of saturated steam.

Figure 6:
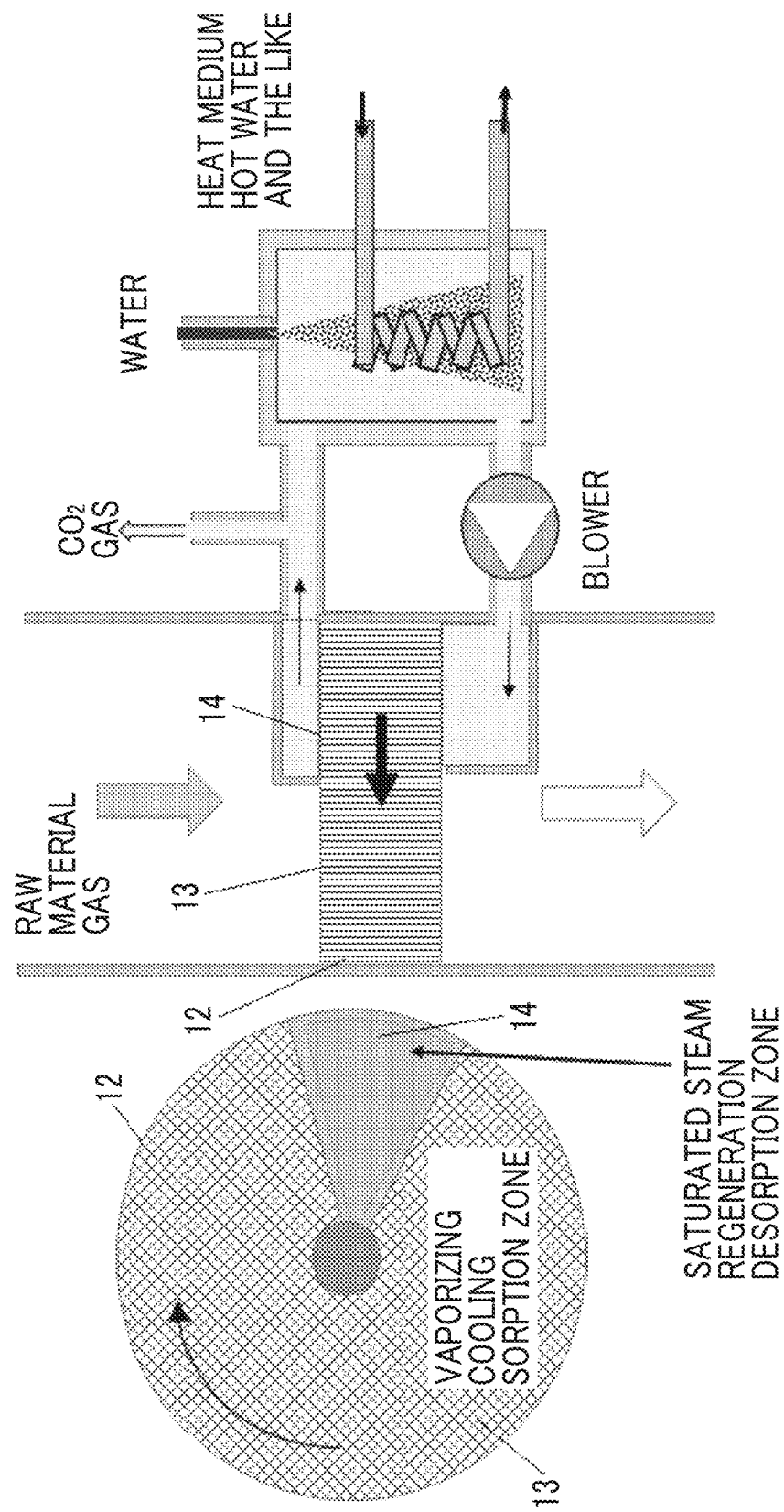
FIG. 6 is a flow chart of Example 1 of the proposed carbon dioxide recovery and concentration device.

FIG. 6 shows horizontal type Example 1. A honeycomb rotor 12 containing 50% by weight of solid amine fine particles and having a bulk specific gravity of 150 kg/m3 is obtained by coating-drying a coat solution obtained by mixing solid amine fine particles having a particle size distribution of 0.02 to 0.1 mm and heat-resistant, water-resistant binder on a porous paper of 30 to 40 g/m2 having inorganic fiber such as glass fiber as a main body to obtain a sheet, subjecting the sheet to corrugate processing at a pitch of 3.0 mm and a height of 2.0 mm, and winding and turning thereof into a rotor.

The carbon dioxide recovery and concentration device equipped with the rotor 12 is provided with a sorption zone 13 and a desorption zone 14, and the honeycomb rotor 12 is configured to return from the sorption zone 13 to the sorption zone 13 via the desorption zone 14.

In a case where the raw material gas after the exhaust gas discharged from the power plant or the like is denitrified, desulfurized, dedusted, and cooled and dehumidified is introduced into the sorption zone 13, carbon dioxide is sorbed on the particulate solid amine supported on the honeycomb.

Sorption heat is generated at a time when carbon dioxide is sorbed, and the carbon dioxide sorption ability is inhibited due to the rise of the gas temperature, but the honeycomb of the sorption stage of the rotor 12 of the inventor's proposal is humidified with condensed water in the desorption stage. Therefore, the raw material gas temperature rises due to heat storage of the honeycomb or sorption heat of carbon dioxide by passing the honeycomb even in the raw material gas having a dew point temperature of about 20° C. D.P., the relative humidity decreases, the condensed water is evaporated, vaporizing cooling phenomenon occurs, the temperature rise is suppressed, and thereby the sorption performance is dramatically improved.

The latent heat of evaporation of water is 2,500 kJ/kg·K, and the latent heat of evaporation of carbon dioxide is 369.9 kJ/kg·K, and it is possible to effectively remove sorption heat by converting the sorption heat to the latent heat of evaporation of water with latent heat of 6 times or more. Therefore, in the technology of FIG. 1 of Non-Patent Document 1, the carbon dioxide recovery rate cannot be improved unless the raw material gas is circulated many times while cooling the raw material gas in the processing zone 4 and the cooling zone 7, but according to the proposal, a sufficient recovery rate can be achieved in one time of pass, and thereby it is possible to to achieve reduction in size of the device and reduction in power of the blower, that is, energy saving properties at the same time.

The honeycomb that has sorbed carbon dioxide moves to the desorption zone 14 by rotation of the rotor. In the desorption zone, a circulation circuit having an inlet and an outlet communicating with each other is configured on the low-temperature side, and a blower and a heat exchanger (heater) are provided in the circuit. The gas in the circuit is circulated by the blower, but a heat source of the exhaust gas or hot water flows onto the high-temperature side of the heat exchanger, water is supplied by spray to the heat exchanger on the low-temperature side of the circulation circuit, the water film generated on the heat transfer surface is heated and evaporated, and saturated steam containing carbon dioxide gas occurs and is introduced into the desorption zone 14. As the honeycomb is heated by the steam and the sorbed carbon dioxide gas is desorbed, the steam is condensed on the honeycomb in parallel. Carbon dioxide gas that becomes excessive in the circuit is taken out and recovered. In a cycle in which the honeycomb after the desorption returns to the sorption zone 13 again, carbon dioxide gas is continuously recovered and concentrated. As the heat exchanger, a sensible heat exchanger may be used.

Figure 7:
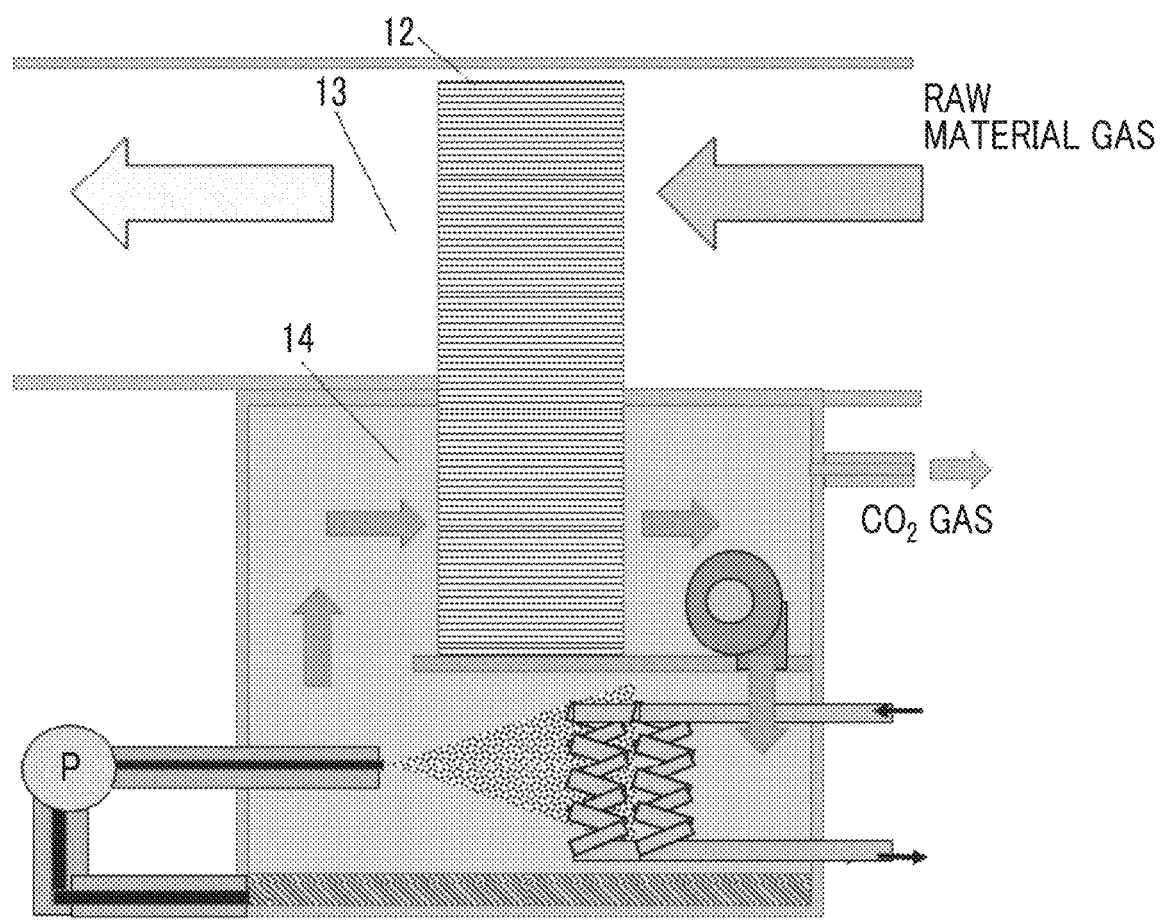
FIG. 7 is a flow chart of Example 2 of the proposed carbon dioxide recovery and concentration device.

FIG. 7 shows a vertical type Example 2. The honeycomb that has sorbed carbon dioxide moves to the desorption zone 14 by rotation of the rotor. A circulation circuit having an inlet and an outlet communicating with each other is formed in the desorption zone, and a blower and a heat exchanger are provided in the circuit, and a temperature control heater as a gas heating heater is provided in a subsequent stage. Exhaust heat such as exhaust gas and hot water is passed through the high temperature side of the heat exchanger.

The gas having carbon dioxide in the circulation circuit on the low-temperature side as a main component is circulated by a blower, water is supplied by spray to the low-temperature side of the heat exchanger, and the water film generated on the heat transfer surface is heated and evaporated to become saturated steam containing gas. In addition, heating is performed in the subsequent temperature control heater, relative humidity is slightly lowered, and the steam is introduced into the desorption zone 14. The honeycomb is heated by the steam to desorb carbon dioxide gas, and at the same time, the steam is condensed on a surface in the honeycomb. The carbon dioxide gas that becomes excessive in the circuit is taken out of the circulation circuit and recovered. The honeycomb after the desorption returns to the sorption zone 13 again, and the carbon dioxide gas can be continuously recovered and concentrated. In a case where a condensed water amount contained in the honeycomb becomes excessive due to the start-up of the device, fluctuations in the outside air temperature, fluctuations in the temperature and humidity of the processing gas, fluctuations in the flow rate, and fluctuations in the heat balance due to heat radiation from the device, the excess water becomes a simple sensible heat medium to reduce the efficiency of the sorption and desorption cycle. For this reason, in a continuous cycle of sorption and desorption, a temperature control heater is provided for controlling the condensed water amount of the honeycomb after passing through the desorption zone.

Figure 8:
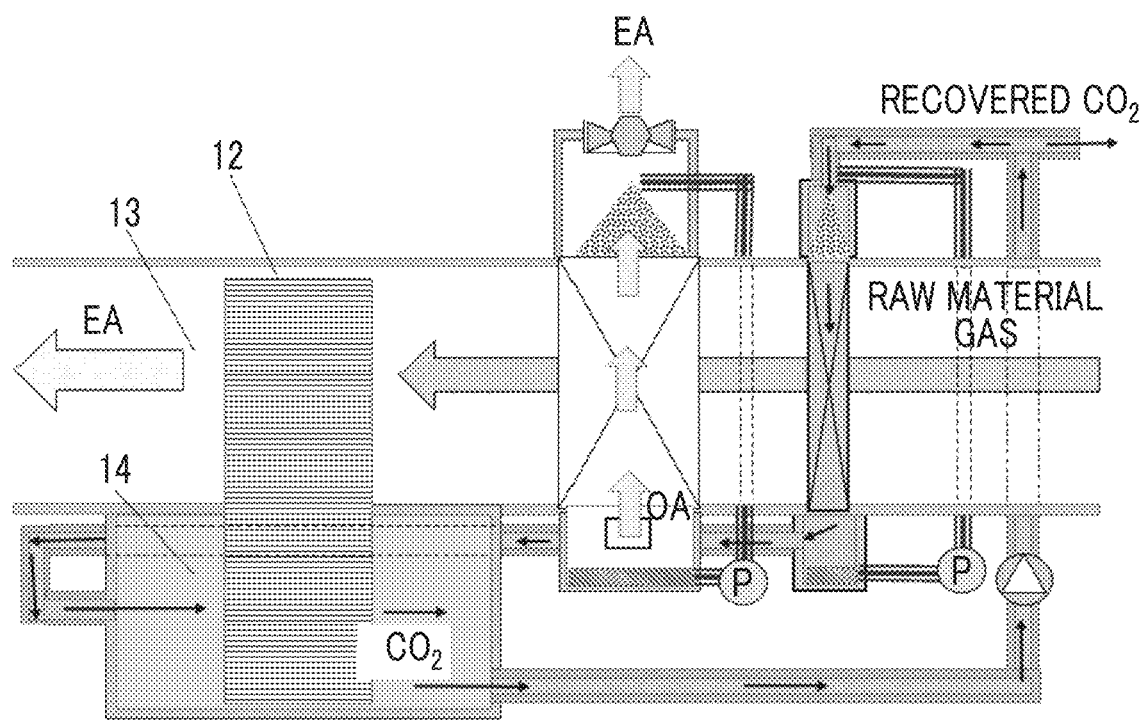
FIG. 8 is a flow chart of Example 3 of the proposed carbon dioxide recovery and concentration device.

FIG. 8 shows Example 3. The flue gas is denitrated, desulfurized, and dedusted to obtain a raw material gas, but the gas still maintains a temperature close to 100° C. and a dew point temperature. The raw material gas side passes through the high temperature side of the heat exchanger for generating desorbed and regenerated saturated steam, subsequently, passes through the high temperature side of the cooling and dehumidifying heat exchanger, is cooled and dehumidified, and is exhausted passing through the carbon dioxide sorption rotor.

The low-temperature side of the heat exchanger for generating desorbed and regenerated saturated steam forms a circulation circuit between the inlet and the outlet on the regeneration and desorption side of the carbon dioxide sorption rotor and a blower. The gas having carbon dioxide as a main component in the circuit is circulated by the blower, and in a case where water is supplied into the low-temperature side heat exchanger, the water film generated on the heat transfer surface evaporates to generate saturated steam, and the steam is introduced into the desorption zone to desorb carbon dioxide sorbed on the honeycomb.

On the low-temperature side of the cooling and dehumidifying heat exchanger, raw material gas that passes through the high-temperature side is strongly cooled and dehumidified due to the indirect vaporizing cooling effect of supplying water with a spray device or the like while introducing outside air OA to evaporate the water film generated on the heat transfer surface. Therefore, it is possible to sorb and recover carbon dioxide with high efficiency by sufficiently exhibiting the evaporative cooling effect in the sorption zone of the sorption rotor. A sensible heat exchanger may be used as the cooling and dehumidifying heat exchanger.

As described above, the present example recovers exhaust heat of the raw material gas, uses the desorption energy, and also cools and dehumidifies the raw material gas by using the indirect vaporizing cooling effect of the outside air. Therefore, by the evaporative cooling effect in the sorption zone, it is possible to dramatically improve a sorption effect of carbon dioxide, to reduce the size of the device, and also to achieve reduction of the running cost at the same time.

FIG. 9 shows Example 4. This is almost the same as Example 3, but in Example 4, a rotary type total heat exchanger is employed as the cooling and dehumidifying heat exchanger, and has an effect of reducing the temperature and humidity by performing total heat exchange between the raw material gas and the outside air. Since there is no limitation on the air volume on the outside air side, the total heat removal efficiency on the raw material gas side is improved to 90% or more in a case where the total heat exchange is performed with the outside air volume of two to three times that of the raw material gas, and since small energy consumption, which is only the power of the blower, is the required energy, the temperature and the humidity of the raw material gas easily come to an equivalent level to the outside air.

The proposed carbon dioxide recovery and concentration device can increase the recovery concentration and the recovery rate at the same time while using the low-temperature exhaust heat, and can effectively perform carbon dioxide concentration with small energy consumption. Therefore, the device can be applied in a case of concentrating and removing carbon dioxide from exhaust gas such as a power plant.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A device to recover and concentrate carbon dioxide, comprising:
    a honeycomb rotor having a sorption ability for carbon dioxide;
    a sealed casing accommodating the honeycomb rotor, the sealed casing having at least a sorption zone and a desorption zone, the desorption zone having an inlet and an outlet, the honeycomb rotor being brought into contact with a mixed gas containing carbon dioxide in the sorption zone while honeycombs of the honeycomb rotor are in a wet state, to sorb carbon dioxide while vaporizing water and cooling the honeycomb rotor;
    a gas circulation circuit connecting the inlet and the outlet of the desorption zone;
    a blower provided in the gas circulation circuit;
    a heater provided in the gas circulation circuit, the heater having a heat transfer surface; and
    a water source to supply water to the heat transfer surface of the heater while the blower circulates gas in the gas circulation circuit, to thereby turn the gas into saturated steam due to a film of water being heated and evaporated on the heat transfer surface, the saturated steam being returned to the inlet of the desorption zone to desorb carbon dioxide from honeycombs of the honeycomb rotor in the desorption zone.

2. The device to recover and concentrate carbon dioxide according to claim 1, wherein
    first and second heaters are provided in the gas circulation circuit,
    the first heater has the heat transfer surface on which water is supplied, the first heater being a saturated steam generating heater, and
    the second heater is a gas heating heater that heats the gas in the gas circulation circuit to lower a relative humidity.

3. The device to recover and concentrate carbon dioxide according to claim 2, wherein
    the second heater is selectively activated to prevent excess water from accumulating in the honeycomb rotor.

4. The device to recover and concentrate carbon dioxide according to claim 1, wherein
    the heater having the heat transfer surface is a saturated steam generating heater,
    the saturated steam generating heater is a sensible heat exchanger having a high-temperature side and a low-temperature side, the low-temperature side having the heat transfer surface,
    a heat medium is introduced on the high-temperature side, and
    water is supplied to the heat transfer surface on the low-temperature side, to thereby turn the gas into saturated steam.

5. The device to recover and concentrate carbon dioxide according to claim 1, wherein the heater having the heat transfer surface is a saturated steam generating heater, a raw material gas is cooled in the saturated steam generating heater and heat from the raw material gas is used as a heat source for generating the saturated steam that is returned to the inlet of the desorption zone, a raw material gas cooling and dehumidifying heat exchanger is provided downstream from the saturated steam generating heater to receive raw material gas that has been cooled in the saturated steam generating heater, the cooling and dehumidifying heat exchanger dehumidifies and further cools the raw material gas by exchanging heat with outside air on a low-temperature side of the cooling and dehumidifying heat exchanger, and after the raw material gas is dehumidified and further cooled, the raw material gas is used as the mixed gas containing carbon dioxide and introduced into the sorption zone of the carbon dioxide sorption rotor.

6. The device to recover and concentrate carbon dioxide according to claim 5, wherein water is supplied to the low-temperature side of the cooling and dehumidifying heat exchanger to remove heat from the raw material gas by an indirect vaporizing cooling effect.

7. The device to recover and concentrate carbon dioxide according to claim 6, wherein a first recovery circulation circuit recirculates excess water supplied to the heat transfer surface of the saturated steam generating heater, a second recovery circulation circuit recirculates excess water supplied to the low-temperature side of the cooling and dehumidifying heat exchanger, and the first recovery circulation circuit is separate from the second recovery circulation circuit.

8. The device to recover and concentrate carbon dioxide according to claim 5, wherein the cooling and dehumidifying heat exchanger is a rotary type total heat exchanger that performs total heat exchange with the outside air.

9. The device to recover and concentrate carbon dioxide according to claim 2, wherein the saturated steam generating heater is a sensible heat exchanger having a high-temperature side and a low-temperature side, the low-temperature side having the heat transfer surface, a heat medium is introduced on the high-temperature side, and water is supplied to the heat transfer surface on the low-temperature side, to thereby turn the gas into saturated steam.

10. The device to recover and concentrate carbon dioxide according to claim 9, wherein a raw material gas is used as the heat transfer medium, the raw material gas is cooled in the saturated steam generating heater and heat from the raw material gas is used as a heat source for generating the saturated steam that is returned to the inlet of the desorption zone, a raw material gas cooling and dehumidifying heat exchanger is provided downstream from the saturated steam generating heater to receive raw material gas that has been cooled in the saturated steam generating heater, the cooling and dehumidifying heat exchanger dehumidifies and further cools the raw material gas by exchanging heat with outside air on a low-temperature side of the cooling and dehumidifying heat exchanger, and after the raw material gas is dehumidified and further cooled, the raw material gas is used as the mixed gas containing carbon dioxide and introduced into the sorption zone of the carbon dioxide sorption rotor.

11. The device to recover and concentrate carbon dioxide according to claim 10, wherein water is supplied to the low-temperature side of the cooling and dehumidifying heat exchanger to remove heat from the raw material gas by an indirect vaporizing cooling effect.

12. The device to recover and concentrate carbon dioxide according to claim 11, wherein a first recovery circulation circuit recirculates excess water supplied to the heat transfer surface of the saturated steam generating heater, a second recovery circulation circuit recirculates excess water supplied to the low-temperature side of the cooling and dehumidifying heat exchanger, and the first recovery circulation circuit is separate from the second recovery circulation circuit.

13. The device to recover and concentrate carbon dioxide according to claim 10, wherein the cooling and dehumidifying heat exchanger is a rotary type total heat exchanger that performs total heat exchange with the outside air.

14. A method for recovering and concentrating carbon dioxide, comprising:

rotating a honeycomb rotor accommodated in a sealed casing, the honeycomb rotor having a sorption ability for carbon dioxide, the sealed casing having at least a sorption zone and a desorption zone, the desorption zone having an inlet and an outlet;

in the sorption zone, bringing the honeycomb rotor into contact with a mixed gas containing carbon dioxide while the honeycombs of the honeycomb rotor are in a wet state, to thereby sorb carbon dioxide while vaporizing water and cooling the sorption zone;

using a blower and a gas circulation circuit to circulate gas from an outlet of the desorption zone to an inlet of the desorption zone;

supplying water onto a heat transfer surface of a heater provided in the gas circulation circuit, the water being supplied onto the heat transfer surface while circulating gas in the gas circulation circuit;

turning the gas into saturated steam by heating and evaporating a water film on the heat transfer surface; and using the gas circulation circuit to introduce the saturated steam into the desorption zone and desorb carbon dioxide from the honeycomb rotor.

15. The method for recovering and concentrating carbon dioxide according to claim 14, wherein first and second heaters are provided in the gas circulation circuit, the first heater has the heat transfer surface on which water is supplied, the first heater being a saturated steam generating heater, and the second heater is a gas heating heater that heats the gas in the gas circulation circuit to lower a relative humidity.

16. The method for recovering and concentrating carbon dioxide according to claim 14, wherein the heater having the heat transfer surface is a saturated steam generating heater, the saturated steam generating heater is a sensible heat exchanger having a high-temperature side and a low-temperature side, the low-temperature side having the heat transfer surface,
a heat medium is introduced on the high-temperature side, and
water is supplied to the heat transfer surface on the low-temperature side, to thereby turn the gas into saturated steam.

17. The method for recovering and concentrating carbon dioxide according to claim 14, wherein
the heater having the heat transfer surface is a saturated steam generating heater,
a raw material gas is cooled in the saturated steam generating heater and heat from the raw material gas is used as a heat source for generating the saturated steam that is returned to the inlet of the desorption zone,
a raw material gas cooling and dehumidifying heat exchanger is provided downstream from the saturated steam generating heater to receive raw material gas that has been cooled in the saturated steam generating heater,
the cooling and dehumidifying heat exchanger dehumidifies and further cools the raw material gas by exchanging heat with outside air on a low-temperature side of the cooling and dehumidifying heat exchanger, and
after the raw material gas is dehumidified and further cooled, the raw material gas is used as the mixed gas containing carbon dioxide and introduced into the sorption zone of the carbon dioxide sorption rotor.

18. The method for recovering and concentrating carbon dioxide according to claim 17, wherein
water is supplied to the low-temperature side of the cooling and dehumidifying heat exchanger to remove heat from the raw material gas by an indirect vaporizing cooling effect.

19. The method for recovering and concentrating carbon dioxide according to claim 18, wherein
a first recovery circulation circuit recirculates excess water supplied to the heat transfer surface of the saturated steam generating heater,
a second recovery circulation circuit recirculates excess water supplied to the low-temperature side of the cooling and dehumidifying heat exchanger, and
the first recovery circulation circuit is separate from the second recovery circulation circuit.

20. The method for recovering and concentrating carbon dioxide according to claim 17, wherein
the cooling and dehumidifying heat exchanger is a rotary type total heat exchanger that performs total heat exchange with the outside air.

* * * * *